United States Patent [19]
Jankelson

[11] 3,722,099
[45] Mar. 27, 1973

[54] METHOD OF ACCURATELY AND PRECISELY CONSTRUCTING ARTIFICIAL DENTURES

[76] Inventor: Bernard Jankelson, 1451 Medical-Dental Bldg., Seattle, Wash.

[22] Filed: Feb. 22, 1971

[21] Appl. No.: 117,542

[52] U.S. Cl. .................................................. 32/32
[51] Int. Cl. ............................................. A61c 11/00
[58] Field of Search .................................... 32/32

[56] References Cited

UNITED STATES PATENTS

| | | | |
|---|---|---|---|
| 2,608,762 | 1/1952 | Fox | 32/32 |
| 2,884,696 | 5/1959 | Bonfanti | 32/32 |
| 3,078,577 | 2/1963 | Prentki | 32/32 |

*Primary Examiner*—Robert Peshock
*Attorney*—Seed, Berry & Dowrey

[57] ABSTRACT

Artificial dentures are accurately and precisely constructed using a dental articulator which is rigid, nonyielding and which stores, preserves and makes available every determinant required to build accurate intercuspation of teeth. A unique transparent tooth-setting guide which allows rapid "see-through" mounting of the casts, indicates the size of the teeth suitable for the case and guides the placement of the teeth. With the dental articulator and transparent tooth-setting guides dentures are constructed by (1) establishing the occlusal plane on the biterim or on the teeth, (2) mounting the lower cast on the articulator in a manner to preserve the plane of occlusion, the mounting making use of the transparent tooth setting guide, (3) mounting the tooth-setting guide to the lower cast, (4) mounting the lower cast to the articulator, (5) mounting the upper cast and (6) arranging the teeth in the casts.

9 Claims, 8 Drawing Figures

PATENTED MAR 27 1973          3,722,099
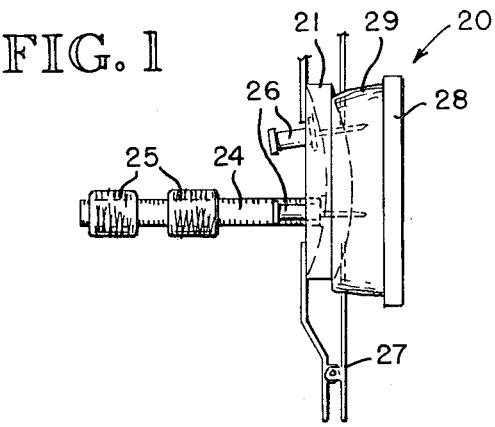
FIG. 1
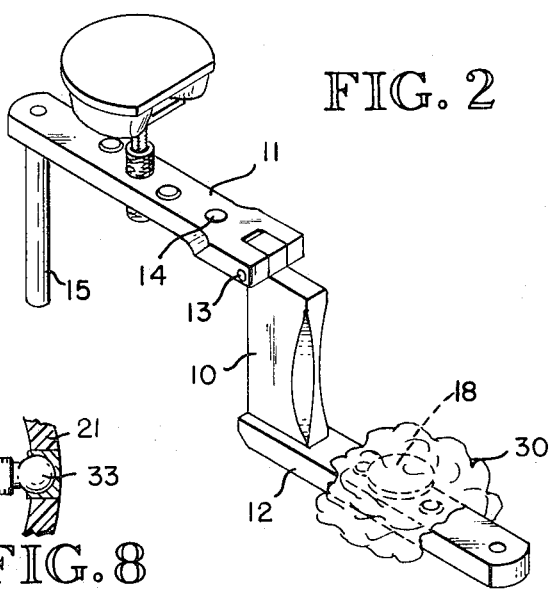
FIG. 2
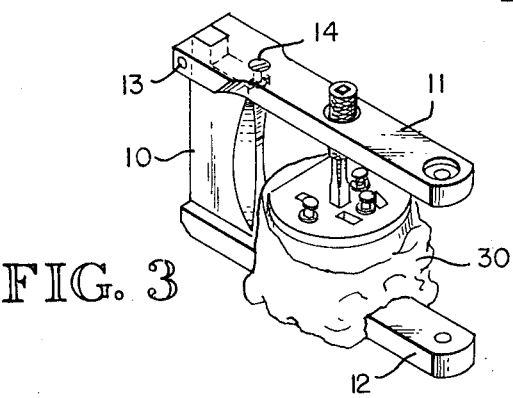
FIG. 3
FIG. 8
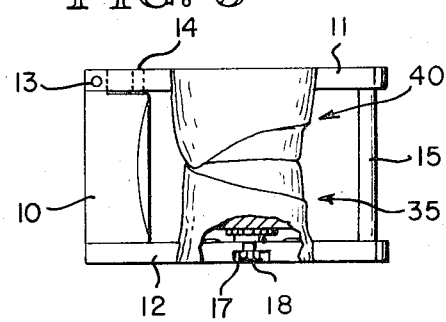
FIG. 5
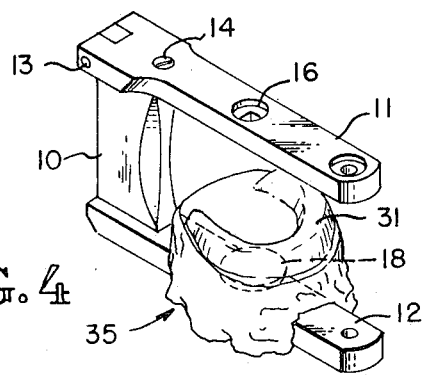
FIG. 4
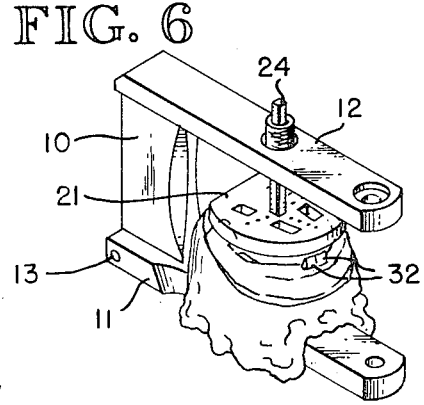
FIG. 6
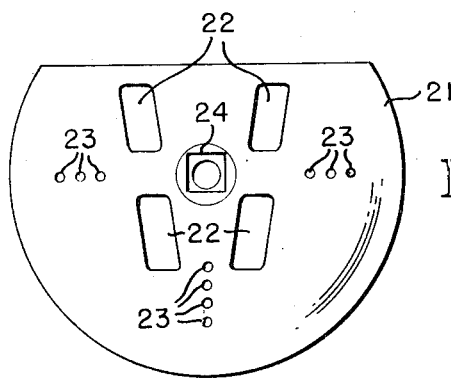
FIG. 7
INVENTOR.
BERNARD JANKELSON
BY
*Seed, Berry & Dowrey*
ATTORNEYS 3,722,099

METHOD OF ACCURATELY AND PRECISELY CONSTRUCTING ARTIFICIAL DENTURES

BACKGROUND OF THE INVENTION

1. Field of the Invention

This invention relates to a method of accurately and precisely constructing artificial dentures and to means for accomplishing such.

2. Prior Art Relating to the Disclosure

In the construction of artificial dentures, biterims representing the lost teeth and tissues are mounted on a base plate which is generally contoured accurately to the denture area. The biterims are formed generally from a heat softenable material such as a high melting point wax. To obtain the approximate occlusal plane of the biterim parallel to the orbital plane, metal arcs are used. The biterims then are generally constructed on plaster casts of the human jaws and mounted on a dental articulator whose function is to furnish a relationship of the jaws of the patient upon which artificial teeth can be arranged within practical limits of accuracy. Artificial teeth are then set to their proper position on the base plate. During the entire process any errors introduced in the casts or their mountings by movement of the articulator or in mounting of the teeth or inaccuracy of the occlusal plane in relation to anatomical structure destroys the proper relationship of the dentures causing improper fitting, improper mastication or other problems.

SUMMARY OF THE INVENTION

This invention relates to a method of accurately and precisely constructing artificial dentures making use of a unique dental articulator and unique tooth-setting guide. The dental articulator used has a posterior post of rugged construction. Lower and upper arms extend at right angles from the posterior post parallel to each other with the upper arm hinged for vertical movement about its connection to the posterior post. The arms are of rugged construction to insure maintenance of the vertical height between them under normal hand pressures. The hinge is constructed to prevent any side play which could cause loss of the precise horizontal or vertical position. In making models of the upper and lower jaws of the patient the lower biterim is secured to a transparent tooth-setting guide in a manner so as to prevent any movement of the guide relative to the biterim in a horizontal or vertical direction. The tooth-setting guide establishes (1) the horizontal plane of occlusion, (2) the anterior-posterior plane of occulsion and (3) the size of the teeth. After constructing the biterim on dental stone the tooth-setting guide is used to mount teeth in the case and to guide placement of the teeth.

It is a primary object of this invention to provide a method of accurately and precisely constructing artificial dentures, (2) to provide a transparent tooth-setting guide available for reference to the occlusal plane as transferred from the mouth and (3) to provide a transparent tooth-setting guide which indicates the size of teeth proper to the case.

BRIEF DESCRIPTION OF THE DRAWINGS

FIGS. 1 to 6 illustrate certain of the steps employed in constructing artificial dentures by the method of this invention using a unique dental articulator and unique tooth-setting guide; and FIG. 7 is a plan view of the transparent tooth-setting guide of this invention; and FIG. 8 is a partial cross-section view through the tooth-setting guide illustrating a modified way of securing the stem to the guide body.

DESCRIPTION OF THE PREFERRED EMBODIMENTS

The dental articulator shown in FIGS. 2 through 6 is a rigid, non-yielding precision instrument which stores, preserves and makes available every determinant required to build accurate intercuspation of teeth. The vertical height and horizontal or "centric" positions are held exactly as registered in the mouth without approximation or guesswork. If the horizontal and vertical dimensions taken from the mouth and transferred to the articulator change on the articulator, both the vertical and horizontal positions are thrown off with the result that the teeth are improperly set, and do not intercuspate precisely. This causes a deleterious function of the musculature of the mouth. The articulator must be able to transmit information accurately and without change so that teeth will be set to certain preset positions. Dental articulators used in the past have not been capable of doing this.

The dental articulator employed in the method of this invention and shown in FIGS. 2 to 6 includes an upright posterior post 10 of rugged construction from which parallel arms 11 and 12 extend. The lower arm 12 is rigidly fixed to the lower end of the post 10. The upper arm is hinged for vertical movement about a hinge connection 13 to the upper end of the posterior post 10. Both the upper and lower arms are of rugged construction so that the vertical height between them cannot be varied by ordinary hand pressures even when the anterior post 15 is removed.

The articulator utilizes a "double stop system" which completely eliminates vertical height collaps and prevents horizontal side play. An adjustable stop 14 contacts the upper surface of the posterior post 10 and stops the upper arm at a predetermined position. The anterior post 15 is removable as shown also can be used to set and adjust the vertical height between the upper and lower arms. The anterior and posterior stops work together as a single stop or they can work independently as two separate stops. In practice, when the anterior pin is removed, the posterior pin 14 acts as a stop to insure precise maintenance of the vertical height. The hinge connection 13 of the upper arm to the posterior post 10 is so constructed to prevent any side play which could cause loss of the precise horizontal or centric position. Square or non-round mounting holes 16 and 17 are provided in the arms 11 and 12 for mounting of cast retainers 18 or the transparent tooth-setting guide 20 to be described.

The transparent tooth-setting guide 20 is shown in plan view in FIG. 7 and comprises an arcuate body 21 of rigid construction to which a vertical stem 24 is attached. The vertical stem should be of a form to prevent rotation thereof relative to the arms of the articulator when inserted therein. The stem, as illustrated in the drawings, is square and adapted to be received in the openings 16 or 17 in the arms of the articulator.

The stem is also secured to the guide body in a manner to prevent rotation of the guide body relative to the stem. This can be accomplished in one way by making a square opening in the guide body through which the square stem is inserted. The arcuate body has a curvature of predetermined dimensions and is generally referenced to the same curvature as metal arcs used to form the occlusal plane of the biterims. The transparent tooth-setting guide performs at least three functions: (1) establishes the horizontal plane of occlusion, (2) establishes the anterior-posterior plane of occlusion, (3) establishes the size of the teeth suitable for the particular case and (4) provides a physical structure against which to set the teeth to correct positions. The tooth-setting guide 20 is suitably made of a structural plastic which is clear and sufficiently rigid that it cannot be distorted under reasonable pressures encountered during construction of dentures. The arcuate body 21 has a number of openings 22 therethrough which are large enough to allow the dentist or technician mounting teeth on the base plate to insert an instrument through the arcuate body 21 to correctly position teeth on the cast. Three sets of programmed holes 23 are used for securing the arc body to the biterims. The anterior set of holes also indicates the size of teeth appropriate to the case. The particular midline hole of the anterior set in the transparent guide body 21 that is over the anterior edge of the lower biterim indicates the size of teeth appropriate to the case. If the most anterior hole is directly over the edge of the biterim it indicates that the mouth is large and that approximately 34 mm posteriors and accordingly large anteriors are indicated. The next hole posteriorily of the first hole indicates 32 mm posteriors, the next 30 mm posteriors and the last 28 mm posteriors. The stem 24 of the transparent guide 20 has two or more adjustable thumb screws 25 secured thereto to secure the guide to the upper and lower arms of the articulator and fix it to a particular vertical height.

In many cases it is necessary to make a correction in the occlusal plane after the teeth are set in the casts. If the occlusal plane is raised vertically, for example, to adjust to a necessary change in the height of the mandibular incisors or other teeth without change in the tilt or angle of the guide body relative to the horizontal plane of occlusion, problems in fitting may occur. To avoid this the stem 24 is hinged to the guide body 21 by a ball and socket arrangement 33 (see FIG. 8) or other suitable means so that the angle of the guide body can be changed relative to an established horizontal plane of occlusion.

METHOD OF CONSTRUCTING DENTURES PRECISELY AND ACCURATELY USING THE TOOTH-SETTING GUIDE AND DENTAL ARTICULATOR

In constructing dentures the upper and/or lower biterims, made in a conventional manner are formed to whatever landmarks the technician or dentist may prefer. A preferred method of forming the upper or lower biterims in wax is to first describe a line on the anterior aspect of the lower biterim about 1 mm above the lower lip and parallel to the orbital plane across the pupils of the eyes. The anterior-posterior occlusal plane is established by dividing the height of each retromolar pad into three parts, drawing a line across the wax impression at the height of the upper third and extending the line over the base plate onto the outside of the lingual flange. The base plate is then placed on a cast and a pencil line drawn across the base of the cast to join the line from the base plate. Metal arcs of a predetermined curvature, conventionally used, are then used to melt the wax of the biterim down to form the occlusal plane. The anterior aspect of the wax biterim is melted down to the orbital reference plane by heating the arc, pressing the heated arc onto the wax biterim and directing pressure to form the wax down to described orbital reference line. This establishes the occlusal plane of the biterim parallel to the orbital plane. The cast is then turned around and the wax forming arc is used to melt the biterim of each side down to the height of the line previously described on the outer surface of the lingual flange. By the process described the plane of occlusion on the lower biterim is established. The centric registration can be obtained in the mouth by imprinting an upper wax biterim against the lower in a conventional manner.

After obtaining the centric registration in the mouth of the patient the lower cast is ready to be mounted on the articulator and should be mounted such that the plane of occlusion is preserved for reference throughout construction of the case. The transparent tooth-setting guide is available for reference to the occlusal plane as transferred from the mouth. A transparent tooth-setting guide having an arc conforming to that of the metal arc used in forming the occlusal plane on the biterim is used. Wax biterims have a way of being destroyed during setting of the teeth. By forming a reference point with the transparent tooth-setting guide against which the teeth are to be set it does not matter whether the wax biterims are destroyed or not.

The transparent tooth-setting guide 21 which matches the metal arc used to form the occlusal plane is secured over the biterim 29 as shown in FIG. 1. The posterior edge of the guide is matched to the mark across the base of the cast and the midline of the arc is matched to the midline mark on the biterim 29. The tooth-setting guide 20 is pinned to the biterim 29 by inserting pins 26 through the holes 23 in the arcuate body 21 of the guide. Spring clamps 27 or other suitable means are used to hold the biterim 29 firmly to the lower surface of the arc body 21. The pin-and-clamp combination holds the orientation firmly during articulation mounting. The pins hold the biterim firmly to the arc in a horizontal position while the clamps hold the arc body firmly in a vertical position and prevent it from dropping away. The tooth-setting guide secured to the biterim 29 in the manner described stores the following in the guide: (1) the horizontal or orbital plane of occlusion, (2) the anterior-posterior plane of occlusion and (3) the size of the teeth appropriate to the case. This information stored in the tooth-setting guide is then ready for transfer to the articulator so that it can be referred to at any time during arrangement of the teeth even though the wax biterim may have been cut away.

The lower biterim mounted as shown in FIG. 1 to the guide 20 is secured to the upper arm of the articulator as shown in FIG. 2. The stem 24 of the guide is inserted through the opening 16 in the upper arm 11 of the articulator and the thumb screws 25 adjusted so that there is a small amount of space between the base 28 and the cast retainer 18 secured to the lower arm 12 of the articulator. The thumb screws 25 are tightened once the position is established so that the vertical height of the guide cannot change. The anterior pin 15 is then bolted above the upper arm of the articulator as shown in FIG. 2 so that when the upper arm is layed back it will support the upper articulator arm against the bench. A casting material 30 such as dental stone is then piled over the lower arm 12 of the articulator and cast retainer 18. The upper arm is then closed to embed the base plate and biterim into the casting material on the lower arm, as shown in FIG. 3. A flexible plastic strip cut to fit around interfering articulator parts may be used to form the casting material neatly by wrapping it around the cast and the mounting. The casting material is then allowed to harden. The transparent guide 20 is then removed from the wax biterim by pulling off the pins and pulling out the clamps. It is desirable at this time to transfer the facial contours of the biterim to the tooth-setting guide by marking around the outside of the biterim onto the lower surface of the body 21 of the tooth-setting guide with a suitable marking pen or grease pencil so that the technician or dentist will later be able to look down through the transparent guide and accurately set the facial surfaces of the mandibular teeth to the line so marked and thus duplicate the contour of the biterim. The tooth-setting guide, once marked, is removed from the articulator.

The upper cast is mounted by securing the maxillary bite rim 31 to the lower biterim with wax or other material as shown in FIG. 4. The cast may be more securely fastened together by heating the jaws of a spring clamp or staple and embedding them to insure that there will be no dislodgement during mounting. A cast retainer is then bolted to the upper arm of the articulator, the anterior pin placed between the articulator arms and bolted to the lower arm. The upper arm is layed back in an open position. A suitable amount of casting material or dental stone is piled onto the disposable cast retainer over the upper arm and the articulator is closed to embed the maxillary cast in the material, as shown in FIG. 5. The casting material is smoothed around the sides of the cast and the articulator anterior pin is bolted to the arm thereby securing both the upper and lower arms in exact parallel relation. The aforementioned plastic strip is wrapped around the base and pulled tight to neatly form the mounting. During setting of the dental stone the rigid upper and lower arms secured by the anterior and posterior posts resist any expansion and thus any change of dimension.

When the casts are hardened sufficiently the anterior pin 15 is unbolted and the articulator opened and the casts removed. The impressions are then softened and separated from the casts in a suitable manner.

FIG. 6 illustrates the manner in which the transparent teeth-setting guide is used in arranging teeth in the cast. A baseplate is fabricated over each cast and the outer surface of the base plate is coated with a sticky wax or other suitable material. For arranging teeth in the lower cast, the lower cast is mounted on the lower arm of the articulator by bolting the cast into place. The tooth-setting guide is then inserted in opening 16 in the upper arm of the articulator to the position originally set. The lower surface of the tooth-setting guide retains the same vertical height as initially programmed. Usually, but not necessarily, the mandibular teeth 32 are first set into the cast. The teeth may be set in several ways either by attaching a roll of soft wax to the biterim with the height of the wax being short and a slight distance below the lower surface of the transparent guide and the teeth placed consectively into the wax while it is still soft. A preferred method is to attach a softened cone of wax to an individual tooth and then attach the tooth to the base plate so that the tooth is slightly higher than it should be. The tooth setting guide is closed against the tooth to drive it to the correct height and the articulator held closed while the gingival slope is adjusted. The wax is then chilled by suitable means to hold the set tooth in the predetermined position. Once the mandibular teeth are set the tooth-setting guide is then removed from the articulator and the upper cast secured to the upper arm. The lower cast may be removed and replaced with the transparent tooth-setting guide for the upper biterim and the two upper centrals set to the correct position using the tooth-setting guide.

Once the centrals in the upper and lower casts are positioned in place the partially set dentures can be inserted into the patient's mouth for checking the comparative length of the mandibular and maxillary teeth during speech and repose and checking the position of the upper teeth in relation to the lips during speech. Any modifications necessary such as change in height of the mandibular incisors may be adjusted on the articulator by adjusting the thumb screws on the stem of the tooth-setting guide to raise or lower the tooth-setting guide to the new height of the incisor edges. Once the centrals are set the remainder of the lower teeth may be set in place using the lines described on the tooth-setting guide as a guide. After these have been set the tooth-setting guide is removed from the upper arm of the articulator and replaced with the upper cast. Then the upper teeth are arranged to fit against their opponents.

When the dentures have been completed the case does not need to be remounted on the articulator to refine the occlusion after processing or casting. The original articulator mountings are preserved. The mountings 35 and 40 are simply bolted back on the articulator arms and the casts attached to the mounting bases according to the indexes.

The method disclosed employing the unique tooth-setting guide and articulator offers unequalled accuracy and precision in the construction of complete dentures or in full mouth rehabilitation.

The embodiments of the invention in which a particular property or privilege is claimed are defined as follows:

1. A method of accurately and precisely constructing artificial dentures comprising:
   1. providing biterims of the lost teeth of the patient mounted on casts,
   2. orienting the biterims and casts to the occlusal plane,
   3. providing a dental articulator having an upright posterior post of rugged construction, upper and lower arms extending parallel to one another at substantially right angles from the upper and lower ends of the posterior post, the upper arm hinged to the posterior post for vertical movement, the upper and lower arms being of rugged construction so that the vertical height between them cannot be varied by ordinary hand pressure, 4. securing the casts firmly in position to the arms of the articulator while mounting to prevent accidental movement or dislodgement thereof, 5. mounting the casts, 6. removing one of the mountings from an arm of the articulator, 7. securing a transparent arcuate tooth-setting guide having openings in the body thereof over the biterim of the cast secured to the articulator, the guide providing vision for physically arranging teeth on the cast against the occlusal plane established by the guide, access to the arranged teeth through the openings to make any corrections in their position, and an indication of the size of the teeth to be used in construction, and 8. physically arranging teeth on the cast against the occlusal plane established by the tooth-setting guide through openings in the body of the guide.

2. The method of claim 1 wherein the casts are secured in step (4) by (a) securing the transparent tooth-setting guide over the biterim of the cast in a manner to prevent movement relative to the biterim either horizontally or vertically and (b) securing the tooth-setting guide to either arm of the articulator at a fixed height and in a manner to prevent rotation thereof relative to the arm.

3. The method of claim 1 including, in step (5), wrapping a flexible strip around the base of the mounting to neatly form the mounting.

4. A transparent tooth-setting guide including a transparent guide body having a lower surface matching the horizontal occlusal plane of a previously formed biterim, the guide body providing clear vision therethrough and having openings therein permitting physical arrangement of artificial teeth on the cast against the horizontal occlusal plane established by the guide and access to the arranged teeth to make any corrections in their position or adjust them to premarked outer contours of the biterim.

5. The guide of claim 4 further including spaced holes through the mid-line of the guide body programmed to determine the size of artificial teeth necessary for construction of the dentures.

6. The guide of claim 4 further including a stem rigidly attached to the guide body and extending vertically, the stem being of a form and adapted to be held by the arm of a dental articulator in a fixed position without chance of rotation or change in vertical height relative to the arm of the articulator.

7. The guide of claim 6 wherein the stem is attached to the guide body by means permitting change in the angle of the guide body relative to the established horizontal plane of occlusion, when necessary for correction of the dentures.

8. A tooth-setting guide comprising a guide body whose lower surface matches the horizontal plane of occlusion of a previously formed biterim, a stem extending vertically from the guide body, and means securing the stem to the guide body which allows a change in the angle of the guide body relative to the stem.

9. The guide of claim 8 wherein the means is a ball and socket connection joint.

* * * * *